(12) United States Patent
Amano et al.

(10) Patent No.: US 6,470,983 B1
(45) Date of Patent: Oct. 29, 2002

(54) HYBRID VEHICLE (75) Inventors: Masahiko Amano, Hitachiota; Ryoso Masaki, Hitachi; Taizo Miyazaki, Hitachi; Tomoyuki Hanyu, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/525,022

(22) Filed: Mar. 14, 2000

(30) Foreign Application Priority Data

Apr. 27, 1999 (JP) ............................................. 11-120139

(51) Int. Cl.$^7$ ................................................ B60K 1/00
(52) U.S. Cl. ...................... 180/65.2; 701/22; 290/40 B; 290/40 C; 290/40 F
(58) Field of Search ............................... 180/65.2, 65.8, 180/65.3, 65.4; 701/22; 318/139; 60/711; 290/40 B, 40 C, 40 F; 322/16

(56) References Cited

U.S. PATENT DOCUMENTS

| | | | |
|---|---|---|---|
| 4,126,200 A | | 11/1978 | Miller et al. |
| 4,305,254 A | | 12/1981 | Kawakatsu et al. |
| 5,069,181 A | | 12/1991 | Togai et al. |
| 5,264,764 A | * | 11/1993 | Kuang .......................... 318/139 |
| 5,343,970 A | * | 9/1994 | Severinsky ................. 180/65.2 |
| 5,698,955 A | * | 12/1997 | Nii .............................. 318/139 |
| 5,724,942 A | | 3/1998 | Maute et al. |
| 5,752,387 A | | 5/1998 | Inagaki et al. |
| 5,771,478 A | | 6/1998 | Tsukamoto et al. |
| 5,778,326 A | * | 7/1998 | Moroto et al. ................. 701/22 |
| 5,789,881 A | * | 8/1998 | Egami et al. ................ 318/139 |
| 5,804,947 A | * | 9/1998 | Nii et al. ....................... 322/16 |
| 5,832,396 A | * | 11/1998 | Moroto et al. ................. 701/22 |
| 5,833,570 A | | 11/1998 | Tabata et al. |
| 5,846,155 A | | 12/1998 | Taniguchi et al. |
| 5,864,770 A | | 1/1999 | Ziph et al. |
| 5,867,009 A | * | 2/1999 | Kiuchi et al. .................. 322/16 |
| 5,892,346 A | | 4/1999 | Moroto et al. |
| 5,898,282 A | * | 4/1999 | Drozdz et al. ............... 318/139 |
| 5,983,740 A | | 11/1999 | Salecker et al. |
| 5,996,547 A | | 12/1999 | Machida et al. |
| 6,018,694 A | * | 1/2000 | Egami et al. ................ 701/102 |

(List continued on next page.)

FOREIGN PATENT DOCUMENTS

| | | | |
|---|---|---|---|
| JP | 5-229351 | | 9/1993 |
| JP | 7-135701 | | 5/1995 |
| JP | 8-086232 | | 4/1996 |
| JP | 8-207601 | | 8/1996 |
| JP | 8-237810 | | 9/1996 |
| JP | 10243503 | | 9/1998 |
| JP | 11-336582 | | 12/1999 |
| JP | 2000-297670 A | | 10/2000 |
| JP | 2000-310131 | * | 11/2000 |

Primary Examiner—Brian L. Johnson
Assistant Examiner—Bryan Fischmann
(74) Attorney, Agent, or Firm—Antonelli, Terry, Stout & Kraus, LLP (57) ABSTRACT A hybrid vehicle is disclosed, in which the drive torque is controlled according to a target, and the engine operating point and the battery charging rate are controlled thereby as targeted to improve the fuel consumption rate of the hybrid vehicle as a whole. An engine torque estimating unit 41 estimates the engine torque based on the motor current, and an engine output correction unit 42 calculates a correct value of the throttle opening based on the difference between the estimated value and the target value. The battery management unit 43, on the other hand, calculates a target battery charge/discharge rate based on the navigation information and the battery charging rate. The engine output correction unit 44 calculates and outputs the correction value of the target battery charge/discharge value based on the difference between the target battery charge/discharge current and the actual current. The corrected target battery charge/discharge value is input to an overall control unit 22 and added to the target engine output value.

1 Claim, 9 Drawing Sheets

U.S. PATENT DOCUMENTS

| | | | |
|---|---|---|---|
| 6,019,698 A | | 2/2000 | Lawrie et al. |
| 6,067,801 A | | 5/2000 | Harada et al. |
| 6,090,007 A | * | 7/2000 | Nakajima et al. ............. 477/46 |
| 6,116,363 A | * | 9/2000 | Frank ........................ 180/65.2 |
| 6,123,163 A | | 9/2000 | Otsu et al. |
| 6,138,784 A | | 10/2000 | Oshima et al. |
| 6,158,541 A | | 12/2000 | Tabata et al. |
| 6,190,282 B1 | * | 2/2001 | Deguchi et al. ................ 477/5 |
| 6,203,468 B1 | | 3/2001 | Nitta et al. |
| 6,215,198 B1 | * | 4/2001 | Inada et al. ................ 290/40 C |
| 6,230,496 B1 | * | 5/2001 | Hofmann et al. ............. 60/706 |
| 6,233,508 B1 | * | 5/2001 | Deguchi et al. ............... 701/22 |
| 6,242,873 B1 | * | 6/2001 | Drozdz et al. .............. 318/139 |
| 6,294,843 B1 | * | 9/2001 | Kato et al. ................ 290/40 C |
| 6,301,529 B1 | | 10/2001 | Itoyama et al. |
| 6,314,347 B1 | * | 11/2001 | Kuroda et al. ................ 701/22 |

* cited by examiner

FIG. 10 ized. In order to drive the vehicle by the driving force obtained from the output shaft of the planetary gear. Part of the energy of the engine is derived from a generator (which is one of the motors) generates power while the motor coupled to the output shaft of the generator delivers a driving force as an assistance. Thus, the engine is always driven efficiently in a high torque area while at the same time providing the shift function.
HYBRID VEHICLE

BACKGROUND OF THE INVENTION

The present invention relates to a hybrid vehicle having an engine and a motor, or, in particular, to a hybrid vehicle in which the fuel consumption can be improved by controlling the operating point of the engine and the battery charging rate according to a target.

One system intended to reduce engine fuel consumption is a hybrid vehicle utilizing the driving force of the motor. Various types of such systems have been proposed, and they include the series type and the parallel type. For example, JP-A-7-135701 discloses a system in which two motors and one planetary gear are used so that the engine driving force is input to the planetary gear, and the motor is controlled in order to drive the vehicle by the driving force obtained from the output shaft of the planetary gear. Part of the energy of the engine is derived from a generator (which is one of the motors) generates power while the motor coupled to the output shaft of the generator delivers a driving force as an assistance. Thus, the engine is always driven efficiently in a high torque area while at the same time providing the shift function.

A method of controlling the driving torque of a hybrid vehicle is described in JP-A-8-207601, in which the torque of the generator is calculated and the torque of the motor on the output shaft is corrected by the calculated torque of the generator. According to this method, the vehicle driving torque is not greatly affected by variations in the engine output, and, therefore, the drivability can be improved.

In order to suppress the change in the charging condition of the battery connected to the generator or the motor, on the other hand, JP-A-10-243503 discloses a method in which the motor torque command or the target engine speed is corrected in accordance with the current value of the battery. This method makes if possible to maintain the normal condition of the battery, and, therefore, the deterioration of the battery can be prevented. Also, the battery charging rate can be controlled as scheduled.

Of all the methods described above, the method of correcting the output of the motor according to the estimated torque value can control the vehicle drive torque as intended, and, therefore, can improve the drivability. Nevertheless, the change in motor output may cause an unexpected charge and discharge of the battery, often leading to the deviation from the optimum schedule for charging the battery, resulting in a deteriorated fuel consumption rate.

According to the method of correcting the motor output or the target engine speed in accordance with the battery current or the like, on the other hand, battery deterioration can be prevented and an optimum schedule can be followed. However, the required driving output cannot be produced, which often adversely affects the drivability.

In any of the methods described above, the engine operating point, if deviated from the target, is not corrected, thereby posing the problem that the engine deviates from the optimum operating point and the fuel consumption rate deteriorates.

SUMMARY OF THE INVENTION

An object of the present invention is to provide a hybrid vehicle in which the efficiency and the fuel consumption can be improved by controlling the engine operating point and the battery charging rate as intended, without adversely affecting the drivability.

In order to achieve the aforementioned object, according to the invention, a hybrid vehicle is provided comprising an engine for generating the energy for driving the vehicle, a transmission for transmitting the driving force to the wheels by changing the rotational speed of the engine, at least a motor for changing the wheel driving force, a battery for supplying power to the motor, and a drive control unit for calculating and outputting an operation command value for the engine and the motor. This is based on the drive information including the accelerator angle, wherein the drive control unit includes an engine output correcting mechanism for correcting the operation command value for the engine, based on the difference between the engine operation command value and the torque generated by the engine, in order to maintain an optimum engine operating point.

The optimum operating point is defined as a point on or near a curve associated with the best fuel consumption rate of the engine, including the efficiency of the transmission and the motor.

According to another aspect of the invention, a hybrid vehicle is provided comprising an engine for generating the energy for driving the vehicle, a transmission for transmitting the driving force to the wheels by changing the rotational speed of the engine, at least a motor for changing the wheel driving force, a battery for supplying power to the motor, means for determining the target engine torque, means for calculating the torque generated by the engine, and means for correcting the engine output, based on the difference between the target engine torque value and the engine torque value calculated by the engine torque calculation means.

According to still another aspect of the invention, a hybrid vehicle is provided comprising an engine for generating the energy for driving the vehicle, a transmission for transmitting the driving force to the wheels by changing the rotational speed of the engine, at least a motor for changing the wheel driving force, a battery for supplying power to the motor, means for determining a target engine output value instead of the engine torque, means for calculating the output of the engine, and means for correcting the engine output, based on the difference between the target engine output value and the calculated engine output value.

According to yet another aspect of the invention, a hybrid vehicle is provided comprising an engine for generating the energy for driving the vehicle, a transmission for transmitting the driving force to the wheels by changing the rotational speed of the engine, at least a motor for changing the wheel driving force, a battery for supplying power to the motor, a battery management unit for determining a target current value of the battery, means for detecting the battery current, and means for correcting the engine output based on the difference between a target battery current and a detected battery current value, wherein the battery management unit produces a schedule for the battery charging rate based on the navigation information, and determines the target battery current value based on the difference between the detected value of the battery charging rate and the scheduled battery charging rate.

The engine output correcting means can correct the output by controlling the degree of the throttle opening degree or correcting the target engine output value.

According to this invention, an optimum engine operating point can be maintained while producing the target vehicle driving torque, and also the battery charging rate can be kept as scheduled for an improved fuel consumption 25 rate.

DESCRIPTION OF THE EMBODIMENTS

Figure 1:
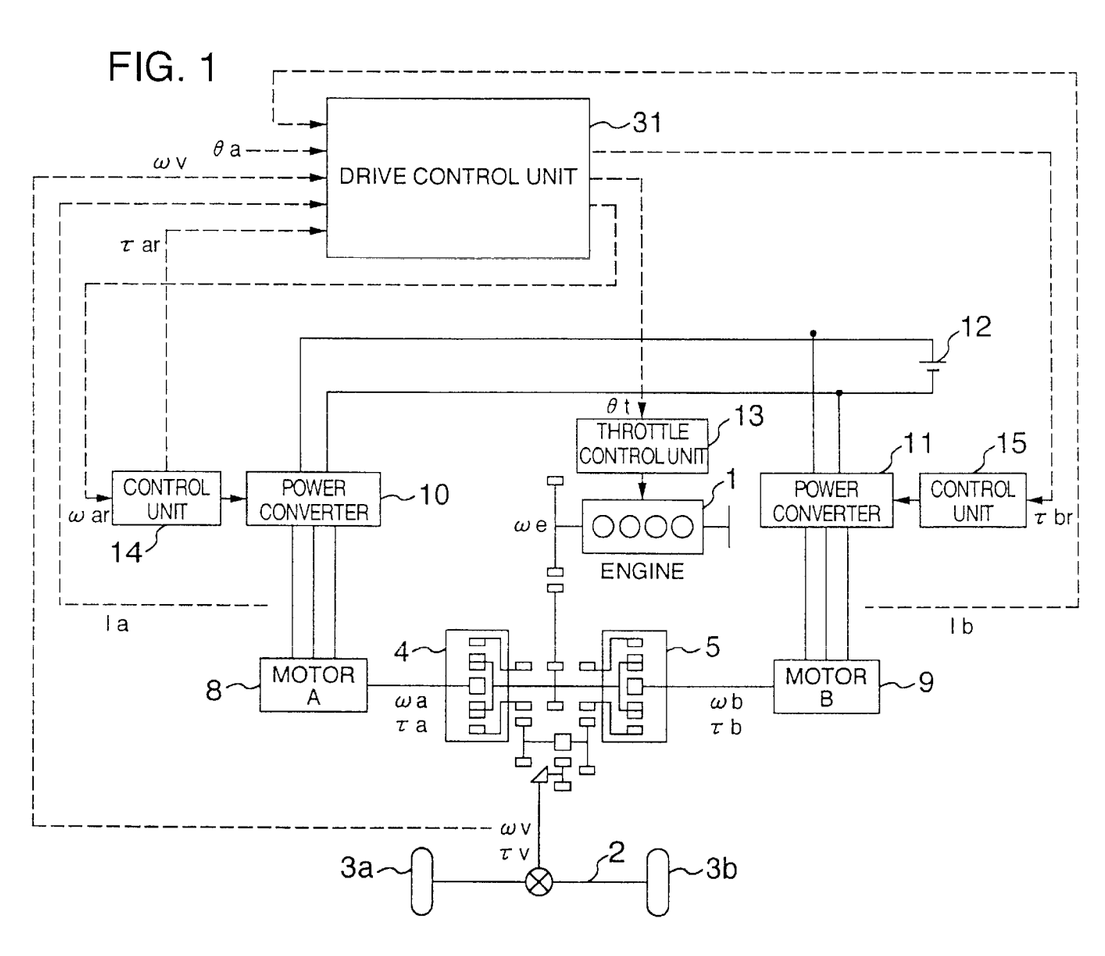
FIG. 1 is a diagram showing an example of a configuration of a driving system of a hybrid vehicle according to this invention.

FIG. 1 shows a hybrid vehicle in which the tires 3a and 3b are rotated using the energy of an engine through a drive shaft 2. This hybrid vehicle includes a planetary gear train A4 and a planetary gear train B5 as a differential mechanism, each including a sun gear, a planetary gear and a ring gear. The sun gears are driven by a motor A8 and a motor B9 controlled by power converters 10 and 11, respectively. The battery 12 is used for supplying the energy required by these motors or for storing the energy generated in these motors at the time of deceleration braking. Each planetary gear is fastened to the same input shaft, and the driving torque of the engine 1 is divided into two or more planetary gears. The ring gears, on the other hand, are coupled to a common output shaft through gears having different gear ratios. The torque output from the two planetary gear trains are combined into a vehicle drive torque τv. As a result, it is possible to secure the acceleration or deceleration of the vehicle as intended by the driver. By controlling the torque τa and τb and the speeds ωa and ωb of the motors A8 and B9 for driving the sun gears, on the other hand, the vehicle drive torque τv and the engine speed ωe can be regulated. The drive control unit 31 calculates and outputs the engine throttle opening degree command value θt, the speed command value ωar of the motor A, and the torque command value τbr of the motor B, using predetermined functions and data according to predetermined processing steps based on the information including the accelerator angle θa, the vehicle speed ωv, the torque command value τar of the motor A, and the currents Ia and Ib of the motors A and B. The drive control unit 31 is configured with a microcomputer including a CPU, a RAM, a ROM, input/output control means, and various programs stored in the ROM.

A specific method of controlling the motors A8 and B9 is described below. In the system shown in FIG. 1, equations (1) to (4) below hold:

$$\omega e = Kp\, a + Ka\omega v \quad (1)$$

$$\omega e = Kp\, a + Ka\omega v \quad (2)$$

$$\tau e = (\tau a + \tau b)/Kp \quad (3)$$

$$\tau e = (Ka\tau a + Kb\tau b)/Kp \quad (4)$$

where ωe, ωv, ωa, ωb are the engine speed, the vehicle speed, the rotational speed of the motor A, and the rotational speed of the motor B, respectively, and τe, τa, τb and τv are the engine torque, the torque of the motor A, the torque of the motor B and the vehicle drive torque, respectively. Characters Kp, Ka, Kb are constants relating to the gear ratio.

Using this relation, the following equation (5) is obtained from equation (1).

$$\omega ar = (\omega er - Ka\omega v) \quad (5)$$

where ωer is the target engine speed, ωv the detected vehicle speed, and ωar the speed command value setting of the motor A.

By controlling the rotational speed of the motor A based on this equation, the engine can be driven at the desired operating point, and the desired change gear ratio is obtained.

Also, let τvr be the target vehicle drive torque, and let τa be the output torque of the motor A, and from equation (4), the following relation holds.

$$Tbr = (Kp\tau vr - Ka\tau a)/Kb \quad (6)$$

Assuming that the τbr determined from equation (6) is a torque setting of the motor A, the desired vehicle drive torque can be obtained.

By controlling the motors according to equations (5) and (6), the engine speed can be controlled to the desired change gear ratio, or the target vehicle drive torque can be generated. Equation (6) contains no engine torque τe, and, therefore, even when the engine torque undergoes a change, the vehicle drive torque can be controlled as intended by controlling the two motors.

The drive control unit 31, which is for realizing the aforementioned control operation, calculates and outputs the engine throttle opening command value θt, the speed command value ωar of the motor A, and the torque command value τbr of the motor B based on the information including the accelerator angle θa, the vehicle speed ωv, the torque command value τar of the motor A and the currents Ia and Ib of the motors A and B. The throttle opening command value θt is sent to the throttle control unit 13, the motor A speed command value ωar is sent to the motor A control unit 14, and the motor B torque command value τbr is sent to the motor B control unit 15, thereby to actually control the engine and the motors.

The motor A control unit 14, based on the difference between the speed command value ωar and the speed detection value ωa, produces the torque command value τar in such a manner as to eliminate the difference by the proportional integral control or the like, thereby to control the power converter. Also, the torque command value τar involved is sent to the drive control unit 31.

Now, the configuration of the drive control unit 31 will be explained with reference to FIG. 2.

First, the target drive torque determining unit 21 determines a target drive torque τvr of the vehicle based on a map predetermined from the accelerator angle θa and the vehicle speed ωv.

In the overall control unit 22, the engine output and the change gear ratio are determined based on the target drive torque τvr and the vehicle speed ωv, and the engine operating point X (the target engine speed ωer, and the target torque τer) is calculated. In the process, the operating point is determined in such a manner as to enable the engine to operate in an area as efficiently as possible.

The engine control unit 23 determines the throttle opening command value θto in accordance with the target engine speed ωer and the target torque τer, determined in the overall control unit 22. The correction value Δθt, determined in the engine output correction unit 42, is added to θto to obtain θt, and a command is issued to the throttle control unit 13.

The motor A control unit 24 calculates the speed command value ωar determined in equation (5), based on the target engine speed ωer determined in the overall control unit 22, and also calculates the actual measurement ωv of the vehicle speed and issues a speed command to the motor A control unit 14.

The motor B control unit 25 calculates the torque command value τbr of the motor B by substituting τar into τra of equation (6), based on the target drive torque τvr of the vehicle and the torque command value τar of the motor A8 sent from the overall control unit 22, and then issues a command to the motor B control unit 15.

The engine torque estimation unit 41 determines an estimated engine torque τe by the following method from the armature currents Ia, Ib of the motors A8, B9.

First, the input torque τai of the motor A8 is calculated based on the following equation from the armature current Ia of the motor A8:

$$\tau ai = Pn\emptyset Iq + Pn(Ld-Lq)IdIq \qquad (7)$$

where ø is the magnetic flux interlinking the armature, Pn is the number of poles, Id and Iq are the Ia components along the d-axis and q-axis, respectively, and Ld and Lq are inductances of the armature winding along d and q axes, respectively.

Then, the output torque T-a is calculated from the 20 relation of equation (8):

$$\tau a = \tau ai - Ja(d\omega a/dt) \qquad (8)$$

where Ja is the inertia of the motor A8, and dωa/dt is the change rate of the rotational speed. The change rate of the rotational speed can be calculated from the difference of the rotational speed ωa or the like. A simple method of this calculation is to ignore the term of the change rate of the rotational speed and to regard the input torque as an output torque.

This is also the case with the motor B, for which the output torque τb is calculated from the armature current Ib. The motor output torques τa and τb, thus calculated, are substituted into equation (3) in order to determine the estimated engine torque τe.

The engine output correction unit 42 calculates the throttle opening correction value Δøt in accordance with the difference between the target engine torque τer 10 and the estimated engine torque τe. The correction value is determined in such a manner as to increase the throttle opening in the case where the estimated torque is smaller, and to decrease the throttle opening in the case where the estimated torque is larger. By doing so, the engine output 15 can be controlled so that the engine torque approaches the target torque.

Figure 3:
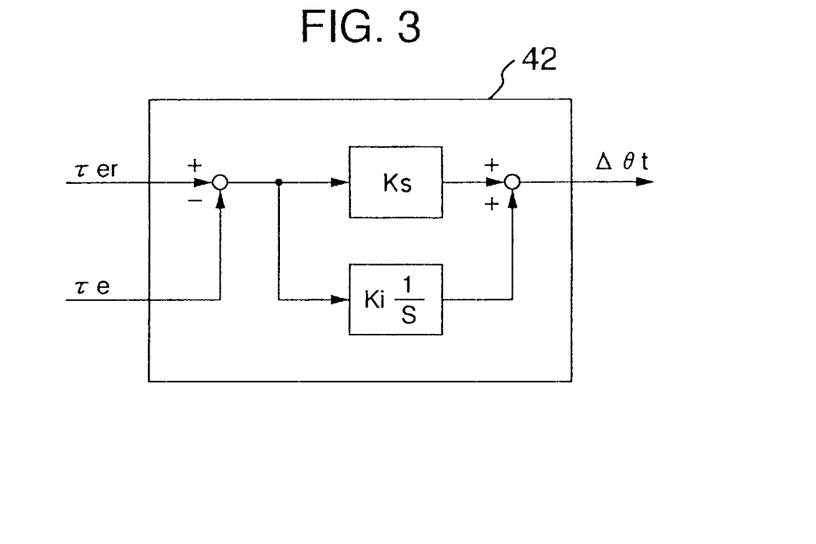
FIG. 3 is a diagram showing a configuration of an engine output correcting unit shown in FIG. 2.

FIG. 3 shows an example of a configuration for the proportional integral control. By setting the gains Ks and Ki appropriately, the control operation can be performed rapidly to eliminate the difference between the target torque and the estimated torque.

Figure 4:
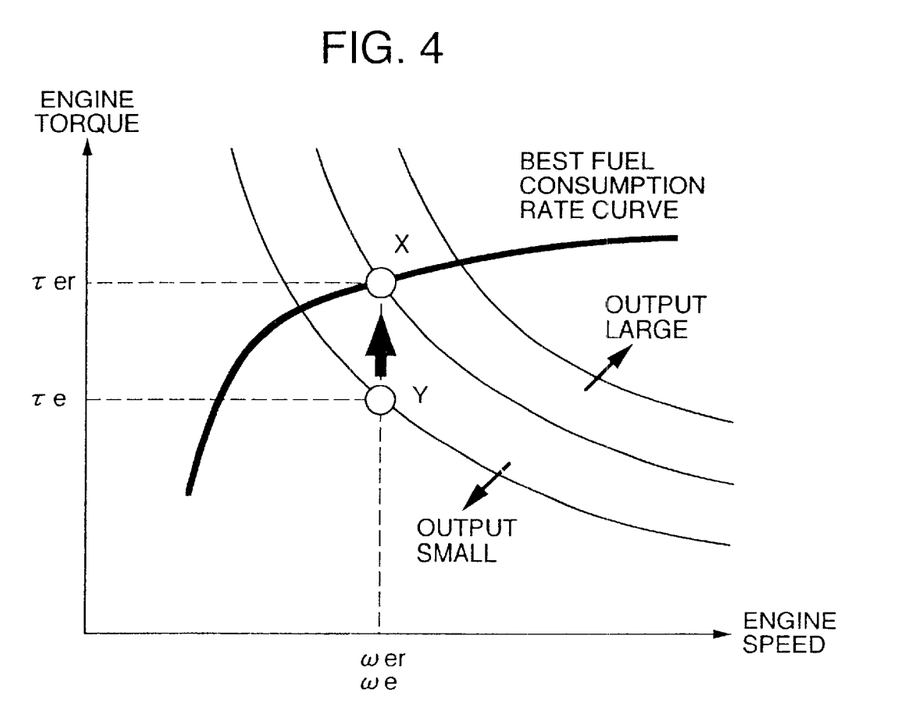
FIG. 4 is a diagram for explaining the engine operating point.

Now, the effect of correcting the engine output will be explained with reference to FIG. 4. It is assumed that the overall control unit 22 has determined a target operating point of the engine at point X on the best fuel consumption curve, including the transmission efficiency and the motor efficiency based on a given target drive torque τvr and the vehicle speed ωv. The engine control unit 23 controls the throttle valve to attain the operating point at point X. However, in view of the fact that the engine characteristics change with the atmospheric pressure or the like, the target output may fail to be achieved. For example, the actual torque may deviate to point Y. Additionally, the engine speed ωe, which can be controlled accurately by controlling the speed of the motor A, is assumed not to develop any deviation.

Once the actual operating point deviates from the target operating point in this way, the optimum operating point is missed, and, therefore, the fuel consumption rate may deteriorate. Also, the control method described above is intended to secure the required drive torque from the motor regardless of the engine torque, and, therefore, the engine output deviation from the target leads to an unexpected discharge or charge of the battery power. In the case of FIG. 4, for example, the engine output runs short, and, therefore, the motor output increases correspondingly, resulting in the battery being discharged. A protracted situation of this battery discharge will cause the battery charging rate to deviate from the target value, and, therefore, the need arises for an unexpected charging operation, thereby leading to an overall deterioration in efficiency.

The present invention is intended for a control operation in which the target engine operating point is set at or in the vicinity of point X (optimum operating point), on the total best fuel consumption rate curve including the efficiency of the transmission and the motor. The use of this method can correct the engine torque deviation and restore the operating point to point X, or at least, to the vicinity thereof. Thus, the engine operates at the optimum operating point and the battery charging rate undergoes no unexpected change, thereby preventing the deterioration of the fuel consumption rate.

In the aforementioned example, the output torque is calculated from the armature current of the motor. As 10 an alternative, an estimated engine torque value τe can be determined by substituting the torque command values τar and τbr directly into τa and τb in equation (3). In such a case, the estimation is possible using a simple method without using the motor current which can increase the likelihood 15 of an estimation error being developed.

A similar effect can also be attained by attaching a torque detector to the engine output shaft and using the output of the torque detector as an estimated torque value. In such a case, the detection accuracy is improved, as compared with the estimation based on the motor torque.

Also, instead of correcting the output based on the deviation from the target engine torque value, as in the aforementioned case, a similar effect can be obtained by a method of detecting the deviation from the target engine output. The engine output is determined as the product of the engine torque and the engine speed. In FIG. 2, therefore, this method can be accomplished by adding the engine speed information.

Figure 5:
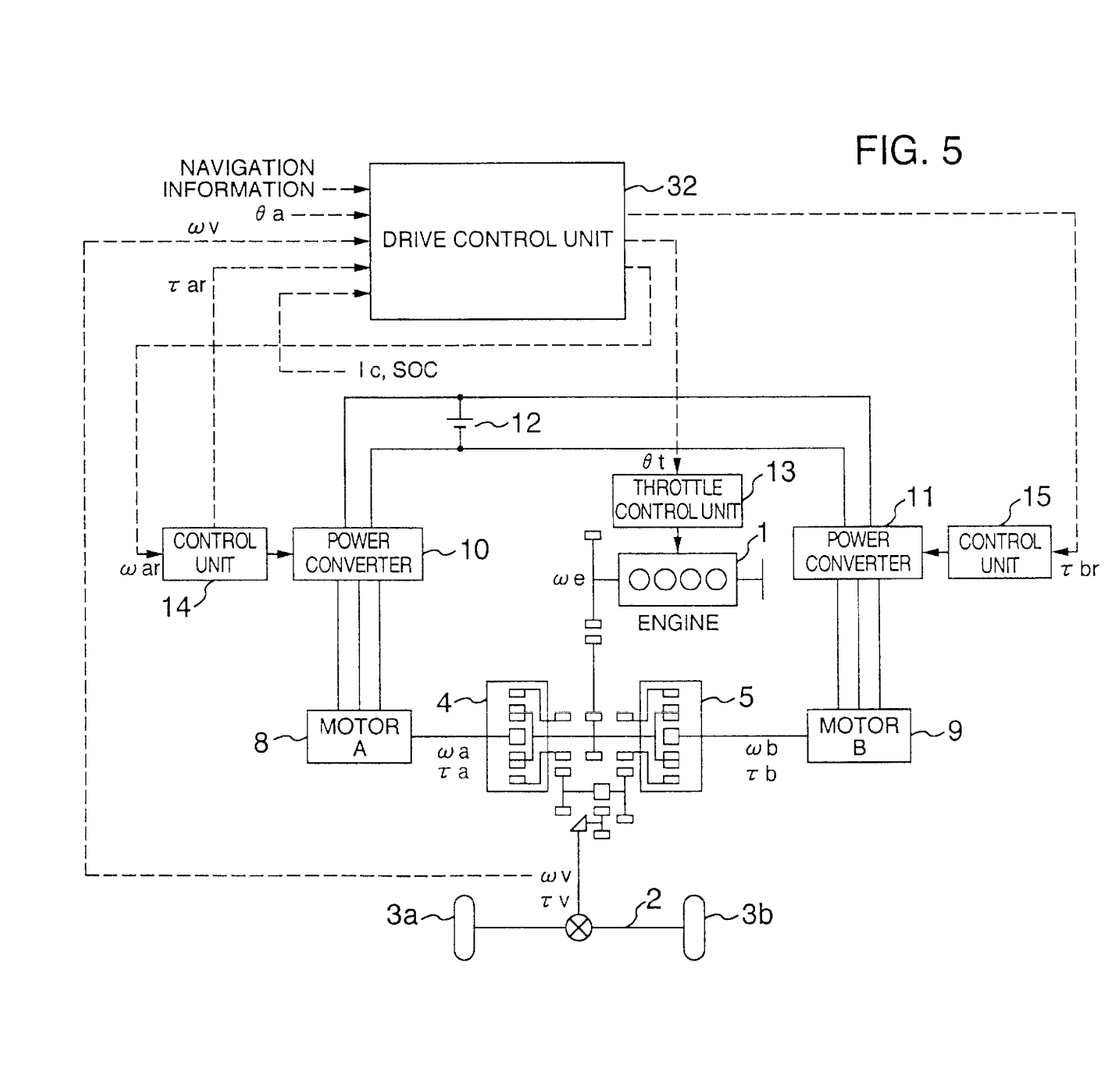
FIG. 5 is a diagram showing a configuration of another example of the hybrid vehicle driving system according to this invention.

Now, another example configuration of the drive control unit will be explained with reference to FIGS. 5 and 6. In this example, the distance to be covered up to the destination constituting the navigation information, the current Ic flowing in the battery 12, and the battery charging rate SOC are inputted to the drive control unit 32.

The battery management unit 43 first produces a schedule for the battery charging rate based on the navigation information. In the situation where a mountainous road and an ascending slope located ahead, the battery charging rate is set to a larger value to provide a sufficient torque assistance from the motor. In the situation where a descending road ahead is forecast, on the other hand, the battery charging rate is set to a smaller value to provide sufficient regenerative braking. Also, in the case where an urban area is nearing and a low-speed run on the motor is expected, the battery charging rate is increased.

Then, the battery charging rate schedule thus prepared is compared with the current battery charging rate, and based on the difference, a target power value Pcr to be charged to (or discharged from) the battery is determined. At the same time, the target value Icr of the charge (or discharge) current of the battery is calculated. The target battery current value Icr is calculated by solving the quadratic equation (9), for example:

$$Pcr=IcVo+Icr^2R \qquad (9)$$

Where Vo is the electromotive force of the battery, and R is the internal resistance of the battery. As for the signs attached to Pcr and Icr, the plus sign indicates discharging.

The overall control unit 22 determines the engine output and the change gear ratio based on the target drive torque τvr, the vehicle speed ωv, and the target battery power Pcr, and then calculates the engine operating point (target engine speed ωer and the target engine torque τer). In the case where the target battery power value Pcr is positive (charging), the target engine output value is the sum of the output for driving the vehicle and the output for charging the battery. In the case where the target value Pcr is negative (i.e., discharge), on the other hand, the target engine output is decreased correspondingly.

As described above, by correcting the target engine output value as required for the charge or discharge of the battery, the battery charging rate can be managed as intended. In view of the aforementioned fact that the engine characteristics are subjected to various changes, however, the target output is not always achieved In the case where the target X is missed and the point Y is reached instead, as shown in FIG. 4, for example, the engine output decreases and the discharge increases correspondingly. Also, the loss occurring in the motor may change depending on the prevailing conditions. As a result, it may be that the target battery current cannot be secured, which often makes it impossible to manage the battery charging rate to the target value. In such a case, the correction is carried out by the engine output correction unit 44, as described below.

In the engine output correction unit 44, the throttle opening correction value Δθt is calculated based on the difference between the target battery current value Icr and the detected current value Ic. In the case where the detected value Ic is smaller, the throttle valve opening is increased in order to increase the charging rate, while in the case where the detected value is larger, the throttle opening value is reduced. As a result, the engine operating point is corrected from point Y to point X, as shown, in FIG. 4 thereby making it possible to control the battery current toward the target value. As for a configuration of the control system, the proportional integral control similar to that shown in FIG. 3 can be used. By doing so, the engine output, even if it deviates from the target value, can be corrected so that the battery current attains the target value.

Now, another configuration example of the drive control unit 32 will be explained with reference to FIG. 7. In this example, the engine output correction unit 45 outputs the battery power correction value ΔPcr, but does not output the throttle opening correction value Δθt, based on the difference between the target battery current value Icr and the detected battery current value Ic, and then adds the battery power correction value ΔPcr to the target battery power value Pcr output from the battery management unit. In the case where the detected battery current value is smaller than the target battery current value, the target battery power value is corrected upward. By doing so, the target engine output value is corrected, and, therefore the engine output is indirectly corrected, thereby making it possible to control the battery current as targeted.

Figure 2:
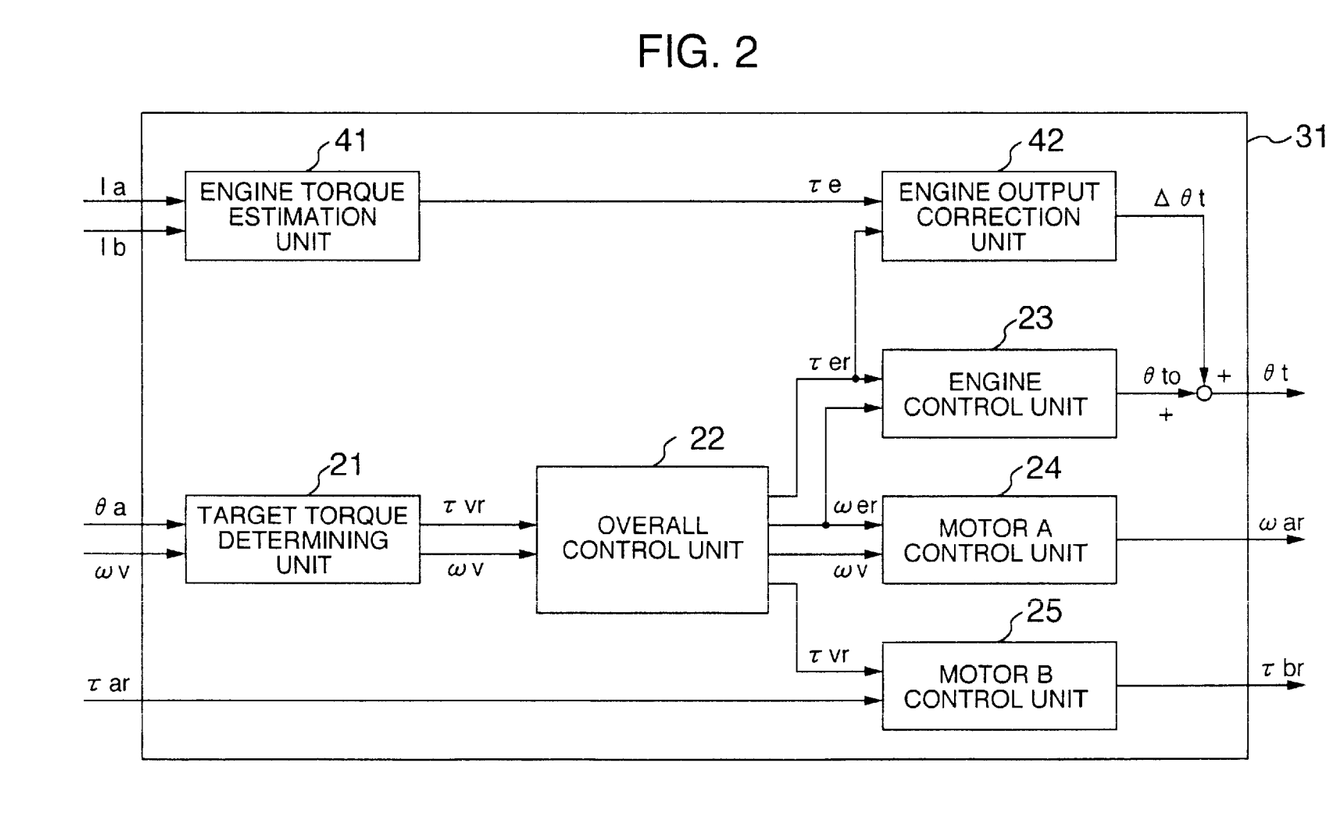
FIG. 2 is a diagram showing a configuration of the drive control unit shown in FIG. 1.
Figure 7:
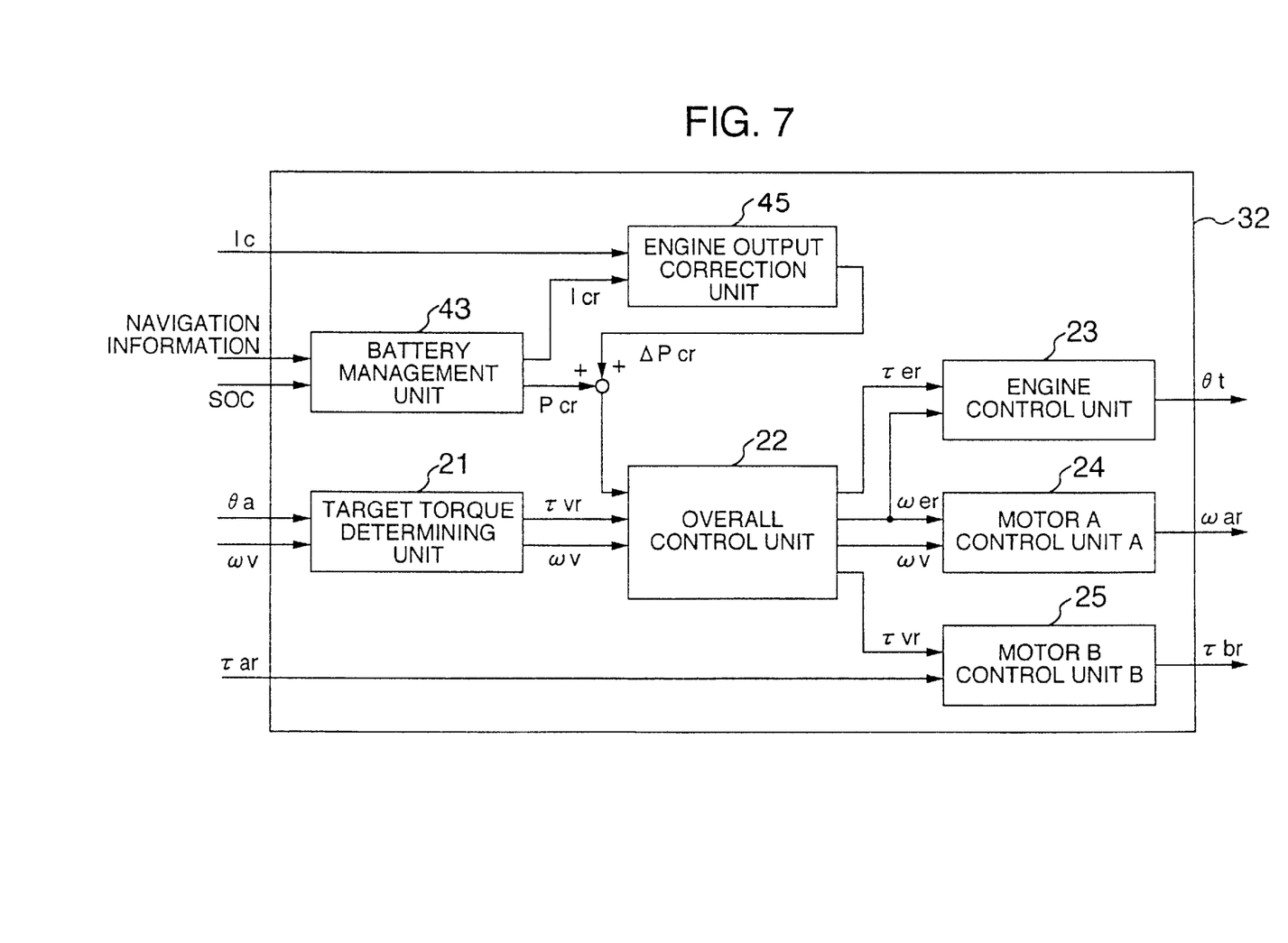
FIG. 7 is a diagram showing another configuration of the drive control unit of the hybrid vehicle driving system according to the invention.
Figure 8:
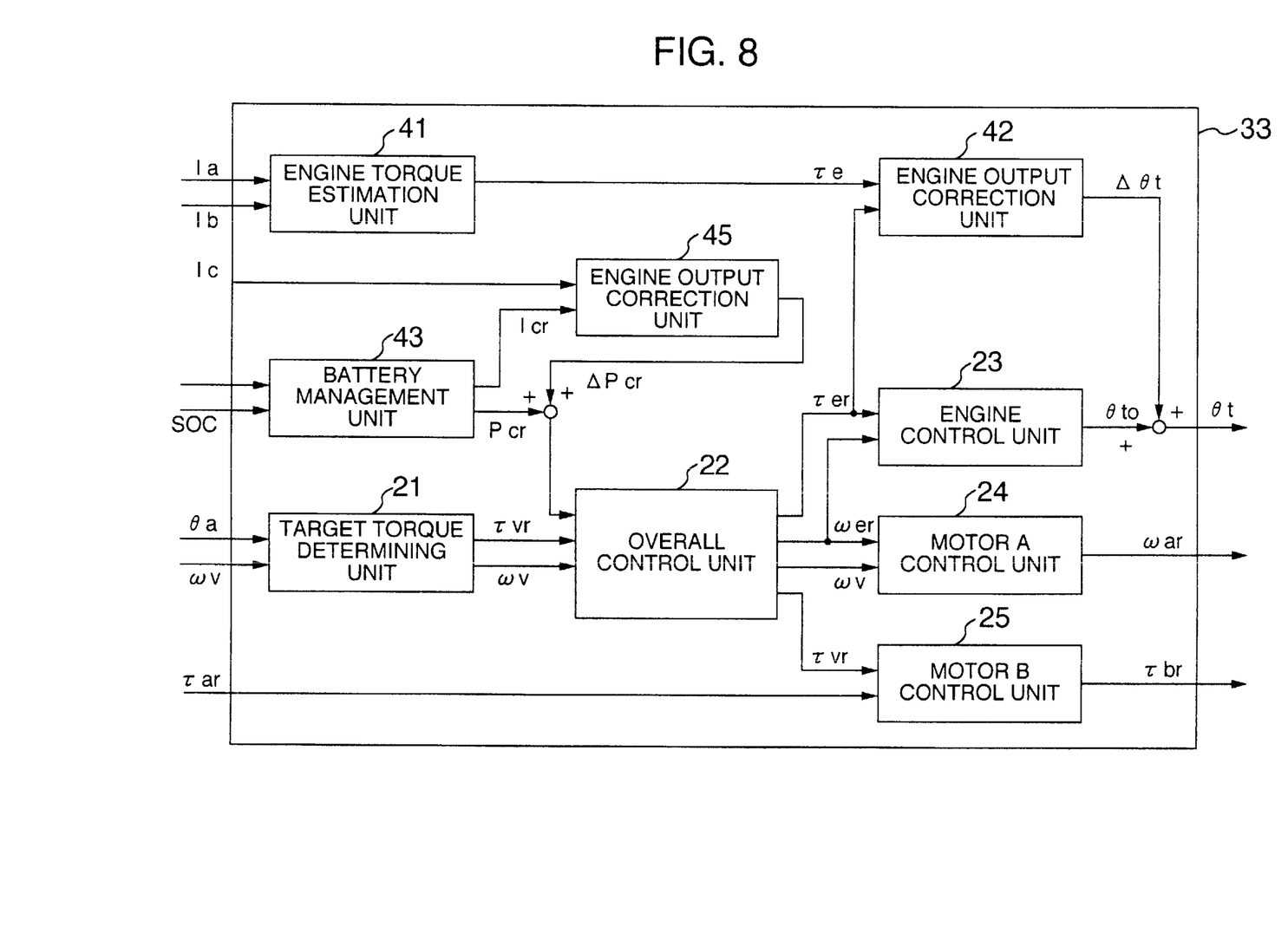
FIG. 8 is a diagram showing still another configuration of the drive control unit according to this invention.

Further, an example configuration with the cases shown in FIGS. 2 and 7 combined is shown in FIG. 8. In this case, the engine output correction unit 42 outputs the throttle opening correction value Δθt, based on the estimated engine torque value, and the engine output correction unit 45 outputs the battery power correction value ΔPcr based on the detected battery current value. With this configuration, the engine is always kept at the optimum operating point, while at the same time controlling the battery current to the target value.

The foregoing description concerns a case in which the schedule for the battery charging rate is prepared by the battery management unit 43, using the navigation information. However, the present invention is also applicable to a case in which the charging rate is managed simply by setting the upper and lower limits thereof without using the navigation information. In such a case, the battery charge and discharge can be controlled to the target by correcting the engine output while always securing the vehicle driving force.

Now, an explanation will be given of the case in which the invention is applied to an ordinary hybrid vehicle other than that shown in FIG. 1.

Figure 9:
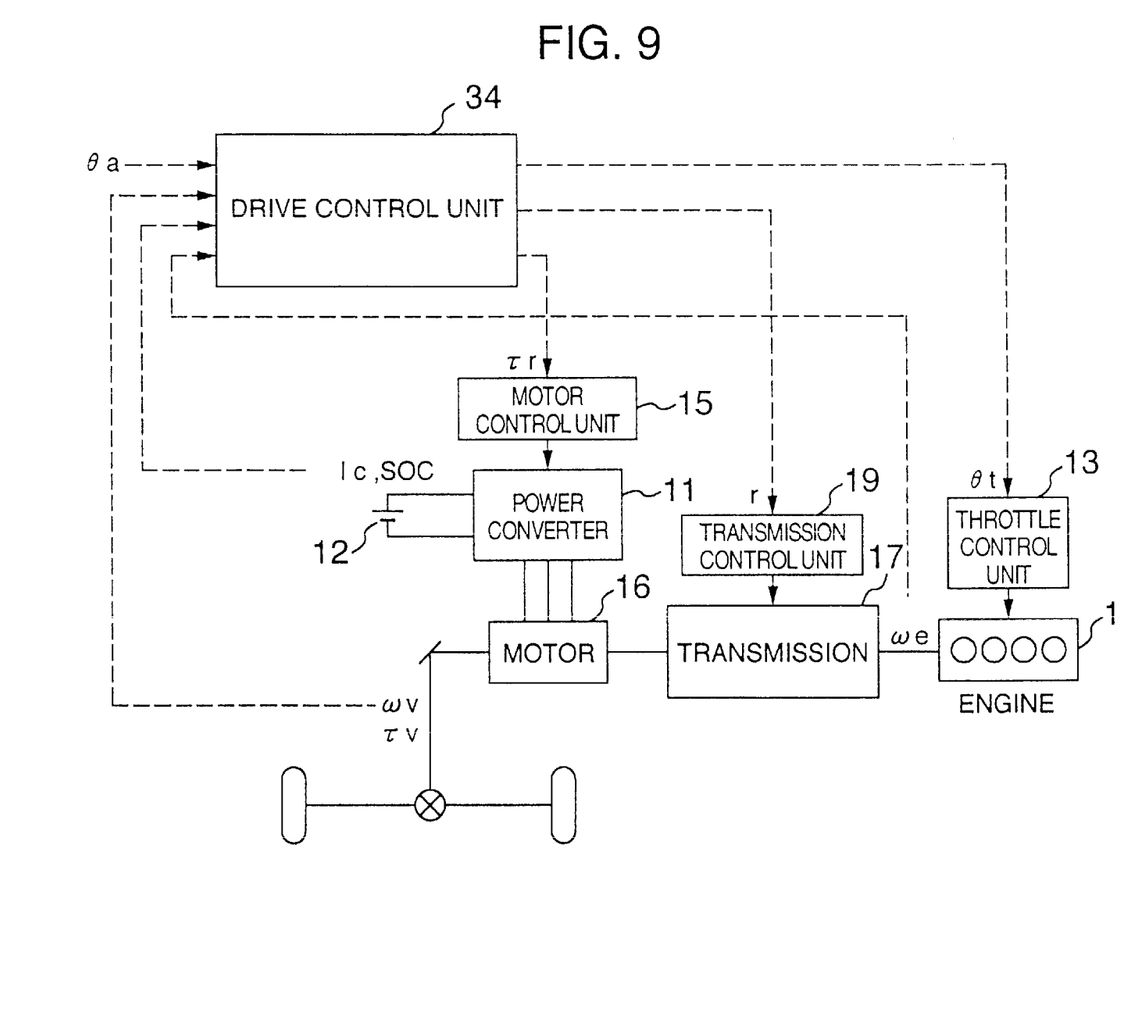
FIG. 9 is a diagram showing a configuration of the hybrid vehicle of another type, according to the invention.

FIG. 9 shows a hybrid vehicle comprising an engine 1, a transmission 17, a motor 16 for changing the drive torque, a power converter 11 and a battery 12 for driving the motor. The drive control unit 34 outputs the engine throttle opening command value θt, the change gear ratio command value r, the motor torque command value τr, based on the information including the accelerator angle θa and the vehicle speed ωv. The throttle opening command value θt is sent to the throttle control unit 13, the change gear ratio command τr is sent to the transmission control unit 19, and the motor torque command τr is sent to the motor control unit 15.

Figure 10:
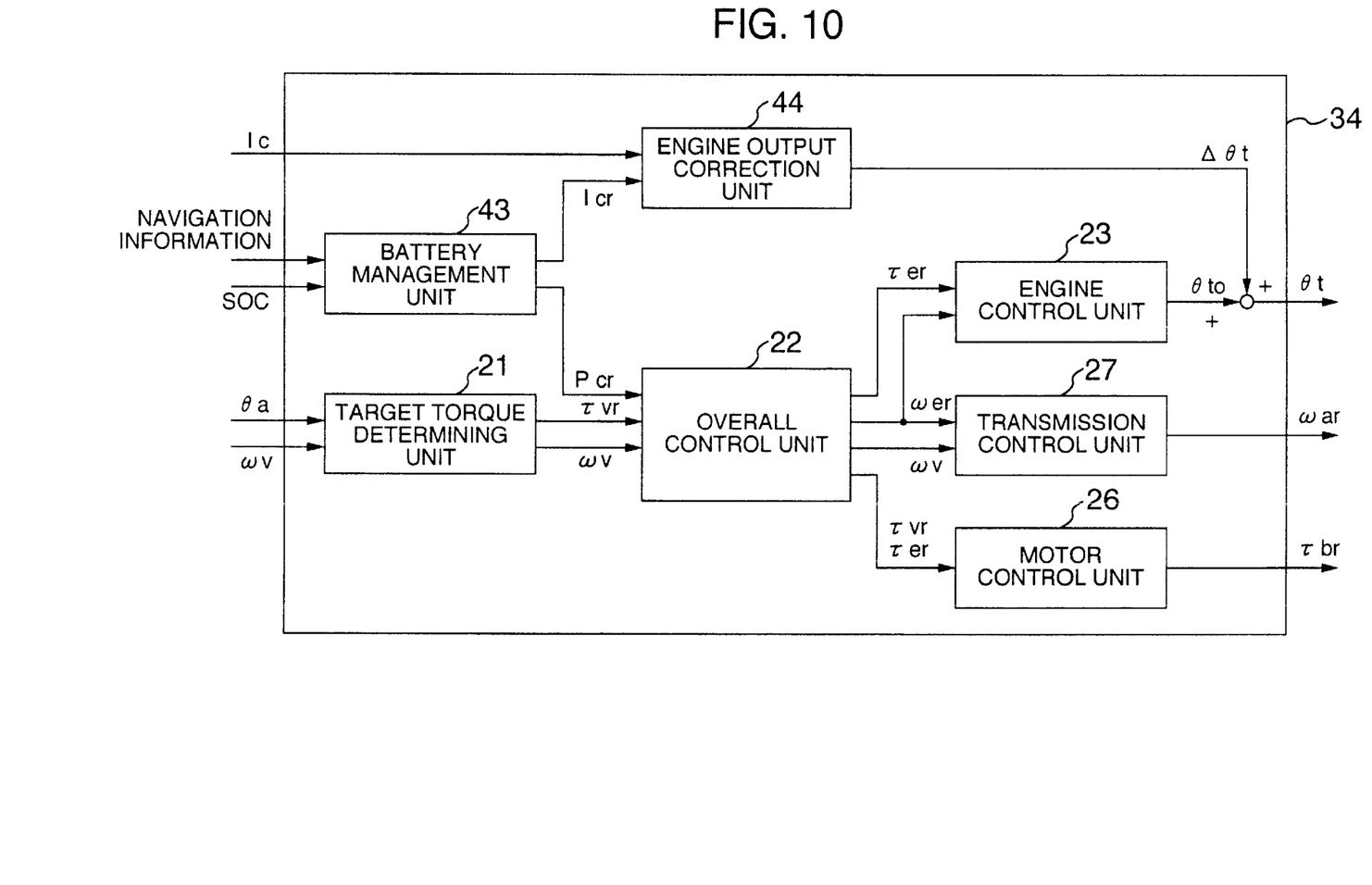
FIG. 10 is a diagram showing yet another configuration of the drive control unit according to the invention.

The configuration of the drive control unit 34 will be explained with reference to FIG. 10. The target torque determining unit 21, the overall control unit 22, the engine control unit 23 and the battery management unit 43 are similar to the corresponding parts shown in FIG. 6. The transmission control unit 27 calculates the change gear ratio command value r from the target engine speed ωer, determined by the overall control unit 22 and the actual measurement ωv of the vehicle speed, and issues a command to the transmission control unit 19. The motor control unit 26 calculates the torque required of the motor for assistance, from the target drive torque τvr of the vehicle and the target engine torque τer, and outputs a motor torque command τr.

Figure 6:
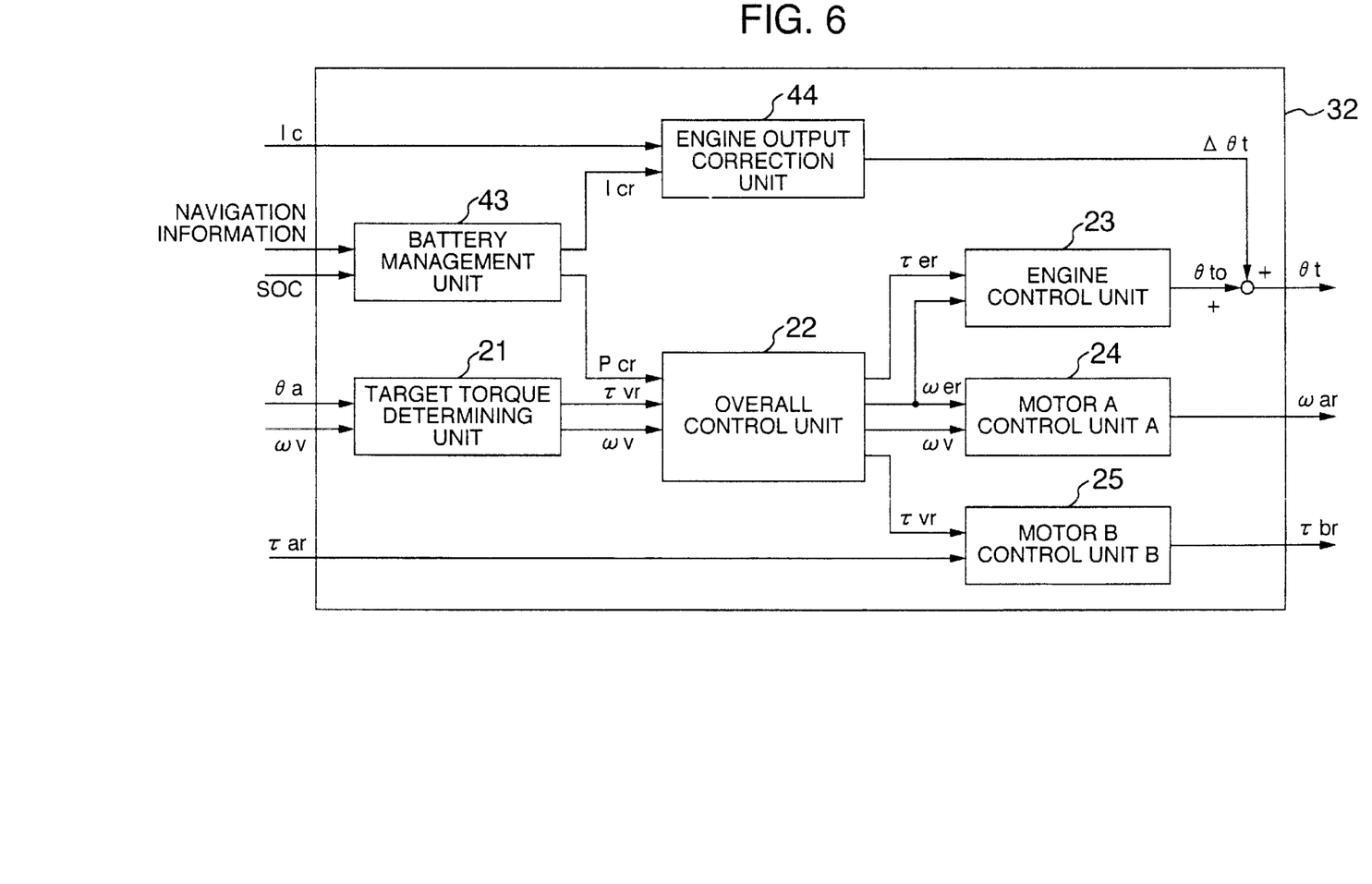
FIG. 6 is a diagram showing a configuration of the drive control unit shown in FIG. 5.

The engine output correction unit 44 operates similarly to the case shown in FIG. 6, and calculates the throttle opening correction value Δθt based on the difference between the target battery current value Icr and the detected battery current value Ic output from the battery management unit 43. In the case where the detected value Ic is smaller, the throttle opening value is increased to increase the charging rate, while in the case where the detected value is larger, the throttle opening is decreased. As a result, the battery current can be controlled so that it approaches the target value.

There is also a method for correcting the battery current which may be different from the target value in response to a command from the motor. This method, however, is employed at the risk of failing to achieve the target drive torque of the vehicle. In this method, if the motor is controlled to produce the target drive torque and the battery current is corrected on the engine side, the battery charging rate can be managed while at the same time producing a target drive torque.

It will thus be understood from the foregoing description that, according to this invention, the engine output is corrected while maintaining a target vehicle driving force, thereby making it possible to control the engine operating point and the battery charging rate to the target, and thereby improving the fuel consumption rate of the vehicle as a whole.

What is claimed is:

1. A hybrid vehicle comprising:

an engine for generating the energy for driving the vehicle;

a transmission for changing the engine speed and transmitting the driving force to the wheels;

a motor for increasing/decreasing the wheel driving force;

a battery for supplying power to said motor on the one hand and recovering the power generated by said motor on the other hand;

battery management means for determining a target current value of said battery;

means for detecting the current of said battery; and means for correcting the output of said engine based on the difference between the target value of the battery current and the value detected by said battery current detection means, wherein said battery management means produces a schedule for the battery charging rate based on the navigation information, and determines a target value of said battery current based on the difference between the detected value of the battery charging rate and said schedule.

* * * * *